US009145027B2

(12) United States Patent
Song et al.

(10) Patent No.: US 9,145,027 B2
(45) Date of Patent: Sep. 29, 2015

(54) WHEEL BEARING ASSEMBLY (75) Inventors: Jae Myeong Song, Osan-si (KR);
Seung-Hwan Baik, Gyeongju-si (KR);
Doo-Ha Lee, Gyeongju-si (KR)

(73) Assignee: ILJIN BEARING, Gyeongju-Si (KR)

( * ) Notice: Subject to any disclaimer, the term of this patent is extended or adjusted under 35 U.S.C. 154(b) by 0 days.

(21) Appl. No.: 14/000,432

(22) PCT Filed: Mar. 4, 2011

(86) PCT No.: PCT/KR2011/001524
§ 371 (c)(1),
(2), (4) Date: Aug. 20, 2013

(87) PCT Pub. No.: WO2012/121425
PCT Pub. Date: Sep. 13, 2012

(65) Prior Publication Data
US 2014/0183932 A1    Jul. 3, 2014

(51) Int. Cl.
F16C 13/02    (2006.01)
B60B 27/00    (2006.01)
F16C 43/04    (2006.01)
B60B 35/18    (2006.01)
F16C 35/063   (2006.01)
F16C 19/18    (2006.01)

(52) U.S. Cl.
CPC ............ *B60B 27/001* (2013.01); *B60B 27/0015* (2013.01); *B60B 27/0078* (2013.01); *B60B 35/18* (2013.01); *F16C 35/063* (2013.01); *B60B 27/0005* (2013.01); *B60B 2380/73* (2013.01); *B60B 2380/75* (2013.01); *B60B 2900/325* (2013.01); *F16C 19/186* (2013.01)

(58) Field of Classification Search
CPC ............ B60B 27/0005; B60B 27/0015; B60B 27/001; B60B 27/0078; B60B 35/18; B60B 2380/73; B60B 2380/75; F16C 19/186; F16C 35/063
USPC ......... 384/504, 494, 517, 538, 584–585, 589, 384/596, 544, 562; 301/105.1, 110; 464/178, 906
See application file for complete search history.

(56) References Cited

U.S. PATENT DOCUMENTS

| | | | | |
|---|---|---|---|---|
| 3,226,169 A * | 12/1965 | Housel et al. | ................. | 384/620 |
| 3,858,942 A * | 1/1975 | Humlong | ................... | 301/110.5 |
| 4,273,391 A * | 6/1981 | Asberg | ......................... | 384/494 |
| 5,383,729 A * | 1/1995 | Hsieh | ........................... | 384/545 |
| 5,553,950 A * | 9/1996 | Pawsat et al. | ................. | 384/545 |
| 5,597,242 A * | 1/1997 | Beeler | ........................... | 384/517 |
| 5,816,377 A * | 10/1998 | Nakamura | ...................... | 192/64 |
| 6,264,575 B1 * | 7/2001 | Lim et al. | ......................... | 192/64 |
| 6,497,515 B1 * | 12/2002 | Sahashi et al. | ................ | 384/544 |
| 6,955,475 B2 * | 10/2005 | Tajima et al. | ................. | 384/544 |

FOREIGN PATENT DOCUMENTS

CN    101057084    10/2007
CN    101238001    8/2008
(Continued)

*Primary Examiner* — Marcus Charles
(74) *Attorney, Agent, or Firm* — Lex IP Meister, PLLC (57) ABSTRACT A wheel bearing assembly includes an outer race in which a plurality of rows of track portions are formed at an inner side thereof; a hub that is coaxially disposed with the outer race to be rotatably disposed in the outer race; an inner race that is engaged with a portion of an outside surface of the hub to rotate together with the hub; a first roller that is interposed between the hub and the outer race to be rolled; and a second roller that is interposed between the inner race and the outer race to be rolled.

18 Claims, 6 Drawing Sheets

(56) References Cited

FOREIGN PATENT DOCUMENTS

| | | | |
|---|---|---|---|
| EP | 1006290 | 6/2000 | |
| GB | 190824961 A | * 0/1909 | |
| JP | 08-093755 | 4/1996 | |
| JP | 10-264605 | 10/1998 | |
| KR | 10-2000-0047825 | 7/2000 | |
| KR | 10-2005-0010646 | 1/2005 | |
| KR | 10-2008-0031960 | 4/2008 | |
| WO | WO 2004113098 A1 | * 12/2004 | ............. B60B 27/02 |

* cited by examiner

WHEEL BEARING ASSEMBLY

TECHNICAL FIELD

The present invention relates to a wheel bearing assembly that includes an outer race that is fixed to a vehicle body, a hub that rotates together with a wheel, and an inner race that is engaged with the hub, wherein an assembly structure and durability of the hub and the inner race are improved.

BACKGROUND ART

A wheel bearing assembly rotatably connects a wheel with a vehicle body in such a way that a vehicle can move. The wheel bearing assembly is divided into a drive wheel bearing assembly that delivers torque of an engine and a driven wheel bearing that does not delivers torque.

The drive wheel bearing assembly includes a non-rotation element that is fixed to a vehicle body and a rotation element that is connected to a drive wheel that is rotated by torque that is generated by an engine and passes through a transmission.

Roller elements are interposed between the rotation element and the non-rotation element. A rotation element of the driven wheel bearing assembly is not connected to a drive wheel, but other structures thereof are equal to that of the drive wheel bearing assembly.

The wheel bearing assembly is manufactured in such a way that a pre-load is formed in the roller element for stability of operating performance, and the assemble structure between an outer race, an inner race, and a hub has to be stable and the assembly thereof has to be easy.

Generally, an inner race is forcibly inserted into a hub, an outer race is disposed to cover the hub and the inner race, a roller is interposed between them, and a sealing member is further added to prevent foreign materials from being permeated into them.

Meanwhile, as the hub and the inner race are forcibly inserted into each other, it is hard to adjust the amount of pre-load in the forcible insertion structure, and there is a problem that maintenance and assembly thereof are difficult by the forcible insertion.

DISCLOSURE

Technical Problem

Accordingly, the present invention has been made in an effort to provide a wheel bearing assembly having advantages of easily forming pre-load in a roller, making the assembly of a hub and an inner race easy, and simultaneously improving the assembly structure thereof when the hub and the inner race are assembled.

Technical Resolution

A wheel bearing assembly according to an exemplary embodiment of the present invention may include: an outer race in which a plurality of rows of track portions are formed at an inner side thereof; a hub that is coaxially disposed with the outer race to be rotatably disposed in the outer race; an inner race that is engaged with one side outside surface of the hub to rotate together with the hub; and rollers that are interposed between the hub and the outer race and between the inner race and the outer race to be rolled, wherein a hub screw portion and a hub forcible insertion portion that is formed near the hub screw portion are formed on one side external circumferential surface of the hub in a circumferential direction, and an inner race screw portion that is engaged with the hub screw portion and an inner race forcible insertion portion that is forcibly inserted into the hub forcible insertion portion are formed on an interior circumference of the inner race in a circumferential direction.

As another exemplary embodiment, the hub screw portion may be disposed at a vehicle body outer side and the hub forcible insertion portion may be disposed at a vehicle body inner side.

As another exemplary embodiment, a length L of the inner race screw portion may be formed to be longer than a length Lh of the hub screw portion.

As another exemplary embodiment, a length Li of the inner race screw portion may be formed to be longer than a length Lh of the hub screw portion.

As another exemplary embodiment, a length Li of the inner race screw portion may be formed to be longer than a length Lf of the hub forcible insertion portion.

As another exemplary embodiment, an inner race socket portion may be formed at an inner side end portion of an interior circumference of the inner race.

As another exemplary embodiment, the inner race socket portion may have a polygon shape that is symmetrically formed based on a rotation center axis.

As another exemplary embodiment, an engagement tool that is engaged with the inner race socket may push the inner race toward the hub in such a way that the inner race is engaged with the hub.

As another exemplary embodiment, the present invention may include a drive shaft that is inserted into an center axis of the hub from a vehicle body inner side to rotate the hub, and a center bolt that is inserted along the center axis of the hub from a vehicle body outer side to a vehicle body inner side to be engaged by a screw structure with a center bolt mounting hole that is formed in the drive shaft in such a way that the drive shaft is tightly engaged with the inner race.

As another exemplary embodiment, a center bolt slant surface of which the diameter thereof is reduced from a vehicle body outer side to an vehicle body inner side may be continuously formed on an external circumferential surface of the center bolt in a circumferential direction thereof, a hub slant surface corresponding to the center bolt slant surface is continuously formed on an interior circumference of the hub in a circumferential direction thereof, and the center bolt slant surface and the hub slant surface continuously contact in a circumferential direction.

As another exemplary embodiment, a first outer race track portion that contacts a first roller that is disposed at a vehicle body inner side and a second outer race track portion that contacts a second roller that is disposed at a vehicle body outer side may be formed in the outer race, and the first outer race track portion, the second outer race track portion, and an area between the first outer race track and the second outer race track portion of the outer race are integrally treated with heat.

As another exemplary embodiment, an inner race track portion that contacts the first roller may be formed on the inner race, a hub track portion that contacts the second roller may be formed on the hub, and the hub track portion, the inner race track portion, and an area between the hub track portion and the inner race track portion may be integrally treated with heat.

As another exemplary embodiment, an outside portion of the hub corresponding to a sealing member that is interposed between the outer race and the hub and the hub track portion may be integrally treated with heat.

As another exemplary embodiment, after the entire inner race is treated with heat, the inner race may be engaged with the hub.

As another exemplary embodiment, parts where the hub and the inner race may be engaged through a screw, engaged through compression, or engaged through close contact may all be treated with heat.

As another exemplary embodiment, at least one of the center bolt slant surface and the hub slant surface may be a plane surface, a curved surface, or a composite curved surface including the plane surface and the curved surface.

As another exemplary embodiment, a taper surface of which a section thereof is reduced from a vehicle body inner side to a vehicle body outer side may be formed at an edge portion of a vehicle body inner side of the inner race socket portion.

As another exemplary embodiment, the taper surface may be a plane surface, a curved surface, or a composited surface including the plane surface and the curved surface.

Advantageous Effects

As described above, in a wheel bearing assembly according to the present invention, because a hub and an inner race are simultaneously engaged through a screw portion and a forcible insertion portion, the assembly becomes easy and the pre-load applied to a roller is accurately and easily controlled.

Also, a length of a screw portion of a hub is formed to be different from that of a crew portion of an inner race in such a way that the assembly and the maintenance become easy regardless of the assembly error and the pre-load can be easily controlled.

Also, in assembling and fixing an inner race on a hub as a conventional art, an orbital forming that changes shapes of an inner race track to be a factor deteriorating durability of a wheel bearing is eliminated and a forcible insertion sector of length direction is minimized, and therefore the durability of a wheel bearing and the durable quality are improved.

Also, in a breakdown condition that is caused by an inner race creep phenomenon where a hub is rotated independent of an inner race and a conventional inner race interior circumference loses fixation force that is formed by forcible insertion with a hub external circumferential surface, although the inner race is rotated in a loosing direction, because an inner race is forcibly inserted into an inner race through a screw engagement, axial direction position of the inner race is fixed by an engagement of a drive shaft and a center bolt in the present invention, the loosing/rotation of the inner race are prevented, and the possibility of the inner race creep is minimized.

Also, an inner race socket portion is formed on an interior circumference of the inner race in a circumferential direction, and an engagement tool corresponding to the inner race socket portion is used to rotate the inner race such that the inner race is easily engaged with the hub.

Also, a first and a second outer race track portions of an outer race contacting a roller are integrally treated with heat to be hardened, an inner race is all treated with heat, a hub track portion of a hub contacting a roller and a part contacting an inner race are all treated with heat, and therefore the durability of the hub and the inner race is improved, particularly, a part of a hub contacting a sealing member and a hub track portion are integrally treated with heat such that overall strength and durability are improved.

| | |
|---|---|
| 100: drive shaft | 105: inner race |
| 110: bolt hole | 115: outer race flange |
| 120: outer race | 125: hub |
| 130: center bolt | 135: hub bolt |
| 140: hub flange | 145, 160: sealing member |
| 150: retainer | 155a, 155b: roller |
| 165: tone wheel | 180: screw portion |
| 185: forcible insertion portion | 190: close contact surface |
| 195: gap | 200: inner race socket portion |
| 300: inner race screw portion | 305: inner race forcible insertion portion |
| 400: hub screw portion | 405: hub forcible insertion portion |

MODE FOR INVENTION

An exemplary embodiment of the present invention will hereinafter be described in detail with reference to the accompanying drawings.

Figure 1:
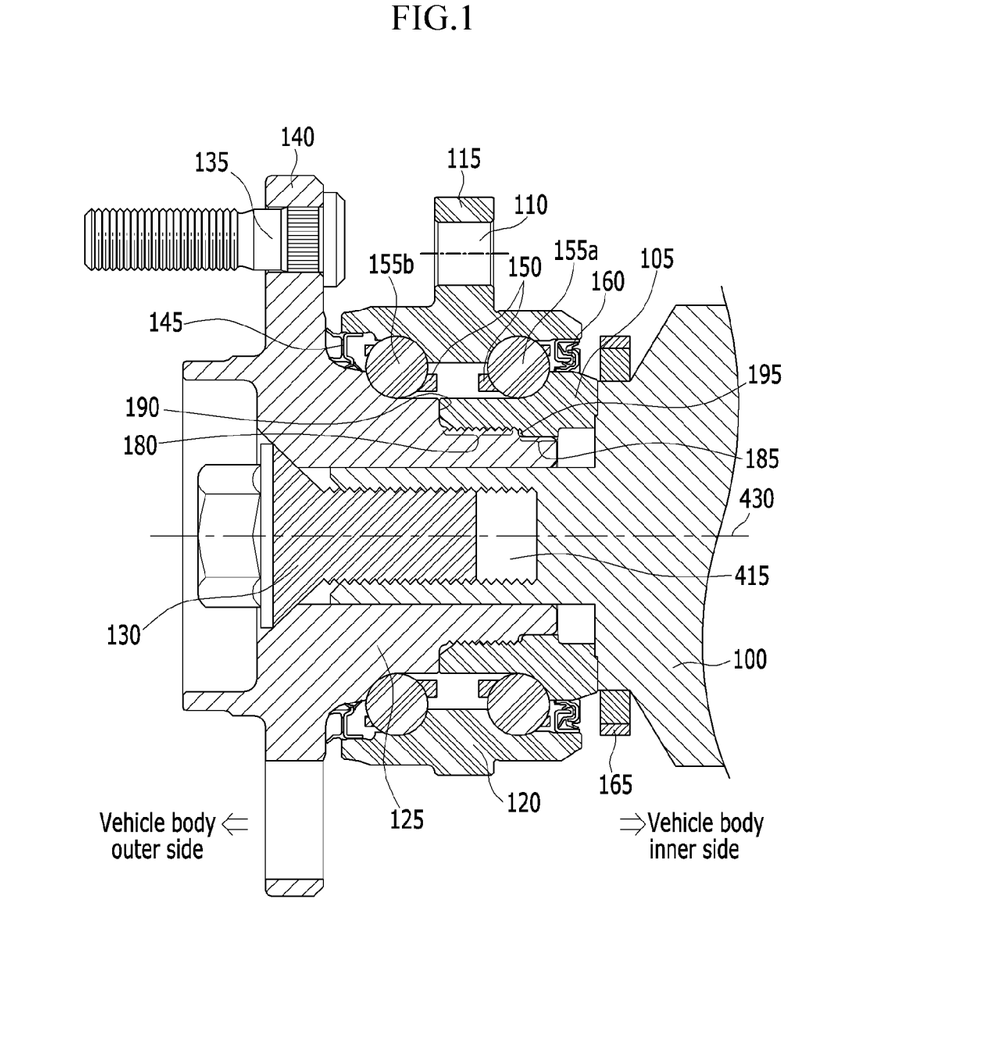
FIG. 1 is an entire cross-sectional view of a wheel bearing assembly according to an exemplary embodiment of the present invention.

FIG. 1 is an entire cross-sectional view of a wheel bearing assembly according to an exemplary embodiment of the present invention.

Referring to FIG. 1, a wheel bearing assembly includes a drive shaft 100, an inner race 105, an outer race 120, a hub 125, rollers 155a and 155b, a hub bolt 135, sealing members 145 and 160, and a center bolt 130.

A hub flange 140 is formed to be extended in a radial direction at a vehicle body outer side of an external circumferential surface of the hub 125, and the hub bolt 135 penetrates the hub flange 140 to be disposed thereon. Further, a brake disk (not shown) and a wheel (not shown) are sequentially fixed on the hub flange 140 through the hub bolt 135.

An outer race flange 115 is formed at a vehicle body inner side on an external circumferential surface of the outer race 120, and a bolt hole 110 is formed in the outer race flange 115. A bolt that is engaged through the bolt hole 110 fixes the outer race 120 to the vehicle body (not shown).

The hub 125 has a structure that is inserted into a hub mounting hole of the outer race 120 together with the inner race 105, the inner race 105 is mounted on the hub 125, and here, a vehicle body inner side on an external circumferential surface of the hub 125 has a structure that is inserted into an interior circumference of the inner race 105. That is, an interior circumference of the inner race 105 tightly contacts an external circumferential surface of the hub 125 to be fixed to each other.

As shown in the drawings, a screw portion 180 that is engaged through a screw structure and a forcible insertion portion 185 that is forcibly inserted are formed on an interior circumference of the inner race 105 contacting an external circumferential surface of the hub 125. The screw portion 180 and the forcible insertion portion 185 will be described with reference to FIG. 2.

The rollers 155a and 155b are respectively interposed between the outer race 120 and the inner race 105 and between the outer race 120 and the hub 125, the sealing members 145 and 160 are respectively disposed at an inner side and an outer side so as to prevent foreign materials from entering into the rollers 155a and 155b, and a retainer 150 supports the rollers 155a and a55b.

In a shown embodiment, an inner side sealing member 160 is mounted earlier than the inner race 105, but the mounting order of sealing members 160 can be changed when necessary.

The rollers include a first roller 155a that is disposed at a vehicle body inner side and a second roller 155b that is disposed at a vehicle body outer side.

The center bolt 130 is inserted along a center of the hub 125, that is, a center axis 430, and the center bolt 130 is engaged with a center bolt mounting hole 415 of the drive shaft 100 through a screw connection.

Here, the center bolt 130 makes the inner race 105 contact the drive shaft 100, and torque of the drive shaft 100 is transmitted to the wheel (not shown) through the hub 125.

Here, a center portion of the drive shaft 100 is inserted into an interior circumference of the hub 125, and a spline is respectively formed on an external circumferential surface of the drive shaft 100 that is inserted into an interior circumference of the hub 125, and on an interior circumference of the hub 125. Accordingly, torque of the drive shaft 100 is transmitted to the hub 125 through the spline.

A tone wheel 165 that is mounted on one side of an external circumferential surface of the drive shaft 100 is used to detect the number of rotations of the drive shaft 100 through a rotation detection sensor (not shown).

However, while the present invention uses a tone wheel so as to detect a rotation speed of a wheel, it is not limited thereto, and for example well-known encoder can be used.

Figure 2:
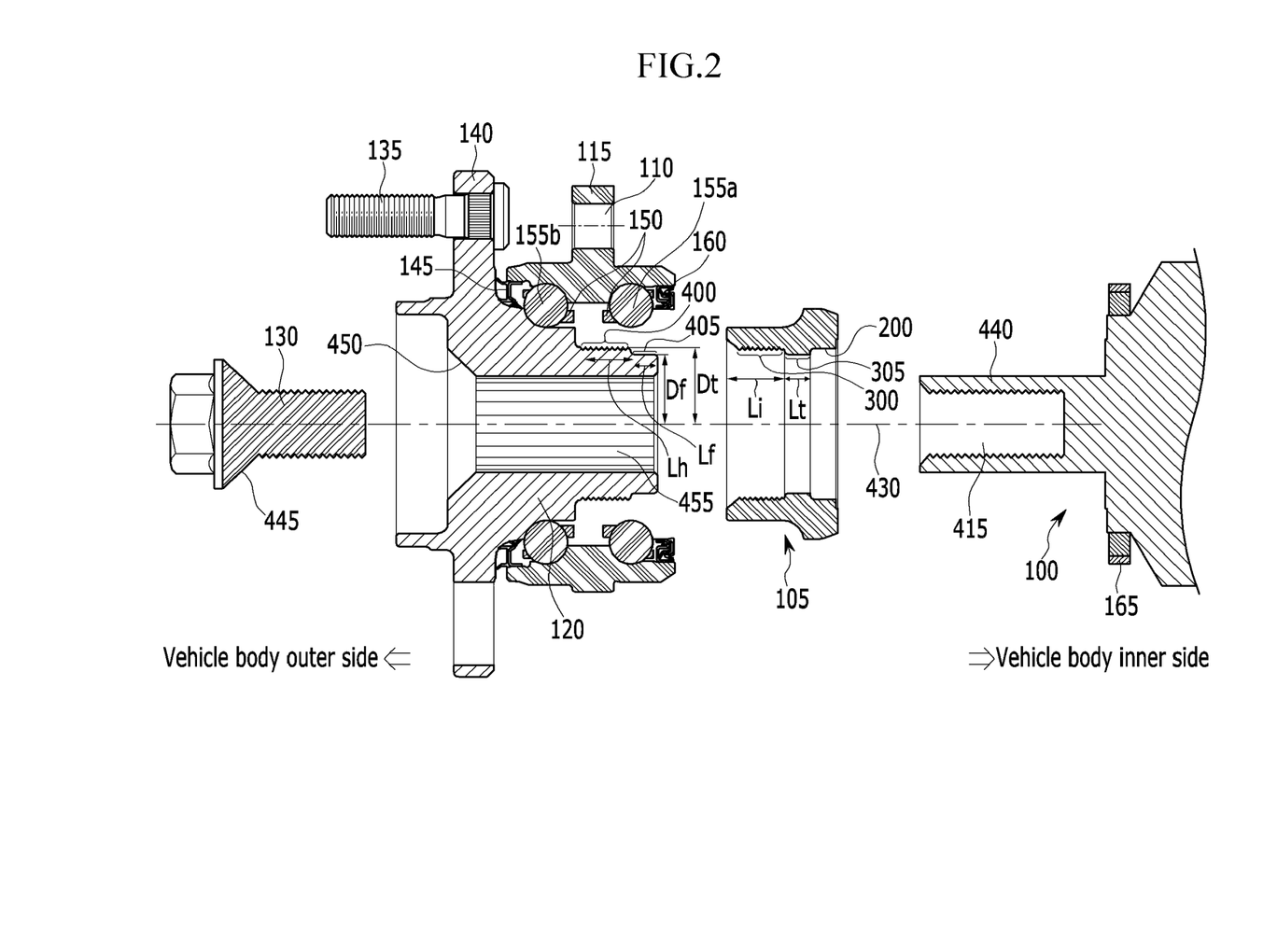
FIG. 2 is a partial exploded sectional view of FIG. 1.

FIG. 2 is a partial exploded sectional view of FIG. 1.

As shown in the drawings, the sealing members 145 and 160 are interposed between the inner race 105 and the outer race 120, the outer race flange 115 is formed in a radial direction of the outer race 120, and the hub 125 tightly contacts an interior circumference of the inner race 105.

Further, an inner race socket portion 200 is formed on an interior circumference of the inner race 105. A shape of the inner race socket portion 200 will be described with reference to FIG. 3.

In succession, referring to FIG. 2, an inner race screw portion 300 and an inner race forcible insertion portion 305 are formed on an interior circumference of the inner race 105, the inner race screw portion 300 corresponds to the screw portion 180 of FIG. 1, and the inner race forcible insertion portion 305 corresponds to the forcible insertion portion 185 of FIG. 1.

The inner race socket portion 200 is formed at an end portion of a vehicle body inner side on an interior circumference of the inner race 105. An operator uses an engagement tool corresponding to the inner race socket portion 200 to rotate the inner race 105 such that the inner race 105 is engaged with the hub 125.

A hub screw portion 400 is formed at a vehicle body outer side on an external circumferential surface of the hub 125, and a hub forcible insertion portion 405 is formed at a vehicle body inner side near the hub screw portion 400.

Further, an inner race screw portion 300 is formed at a vehicle body outer side outer side on an interior circumference of the inner race 105 corresponding to the hub screw portion 400, and an inner race forcible insertion portion 305 is formed at a vehicle body inner side near the inner race screw portion 300. The inner race screw portion 300 is engaged with the hub screw portion 400 through a screw connection, and the inner race forcible insertion portion 305 is forcibly inserted into the hub forcible insertion portion 405.

As shown in the drawings, the diameter (Dt) of the hub screw portion 400 is larger than the diameter (Df) of the hub forcible insertion portion 405, and the interior diameter of the inner race screw portion 300 is larger than the interior diameter of the inner race forcible insertion portion 305.

Further, the length (Li) of the inner race screw portion 300 is longer than the length (Lf) of the hub forcible insertion portion 405, after the inner race screw portion 300 is engaged with the hub screw portion 400, the inner race forcible insertion portion 305 is forcibly inserted into the hub forcible insertion portion 405.

Figure 4:
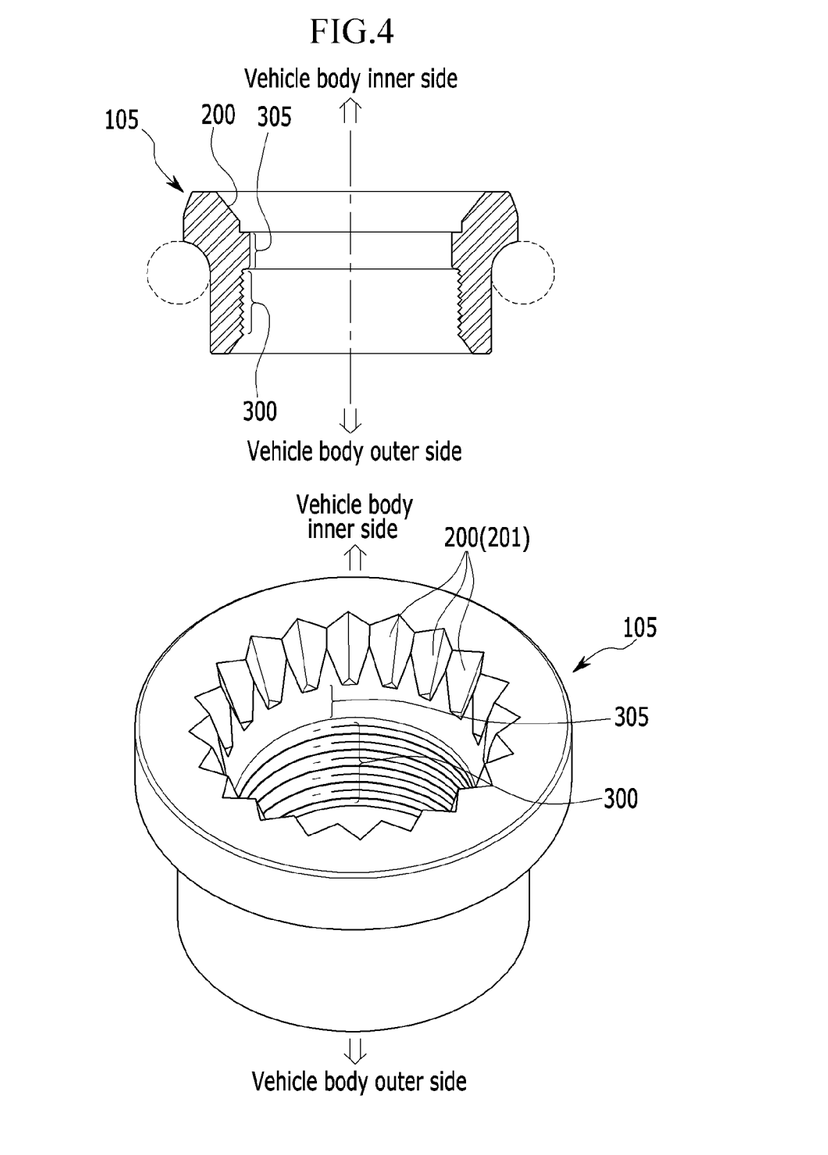
FIG. 4 is a perspective view of an inner race according to another exemplary embodiment of the present invention.

Accordingly, with reference to FIG. 1 and FIG. 4, one end portion of the inner race 105 tightly contacts one side surface of the hub 125 to form a close contact surface 190, and a gap 195 is formed between the inner race forcible insertion portion 305 and the hub screw portion 400.

If the length (Li) of the inner race screw portion 300 is shorter than the length (Lh) of the hub screw portion 400, a gap is formed instead of the close contact surface 190 and there is a problem that a predetermined range of pre-load is not formed in a bearing.

In a FIG. 2, the inner race screw portion 300 is formed at a vehicle body outer side of the inner race 105, the inner race socket portion 200 is formed at an inner side, and the inner race socket portion 200 is formed in a circumferential direction based on the center axis 430.

An engagement tool (not shown) corresponding to the inner race socket portion 200 of the inner race 105 is used to rotate the inner race 105 such that the inner race 105 is mounted on the hub 125, and the drive shaft 100 is inserted into the hub 125 from an inner side to a vehicle body outer side along the center axis.

Next, if the center bolt 130 is inserted into the hub 125 along the center axis to be engaged with the center bolt mounting hole 415 of the drive shaft 100 through a screw connection, as shown in FIG. 1, the drive shaft 100 tightly contacts a side surface of the inner race 105.

Referring to FIG. 1 and FIG. 4, while the inner race 105 is assembled to the hub 125 through the screw portion 180 and the forcible insertion portion 185 in an exemplary embodiment of the present invention, a pre-load is formed in the roller 155, and when the close contact surface 190 is formed between the hub 125 and the inner race 105, the assemble thereof is completed and the pre-load can be further adjusted by the inner race 105.

Referring to FIG. 2, a screw portion is formed at a vehicle body inner side of the center bolt 130, and a nut and a center bolt slant surface 445 are formed at a vehicle body outer side. Further, a mounting hole 455 that is opened at both ends is formed along the center axis of the hub 120, and a hub slant surface 450 is formed at a vehicle body outer side on an external circumferential surface of the mounting hole 455.

The center bolt slant surface 445 has a continuously smooth surface in a circumferential direction, and the hub slant surface 450 has a continuously smooth surface in a circumferential direction corresponding to the center bolt slant surface 445.

Referring to FIG. 1 and FIG. 4 again, if the center bolt 130 is inserted into the mounting hole 455 and 415 to be engaged with the drive shaft 100, the center bolt slant surface 445 of the center bolt 130 continuously contacts the hub slant surface 450 in a circumferential direction.

Accordingly, because a gap is not formed between the center bolt slant surface 445 and the hub slant surface 450 in an assembled condition, permeation of foreign materials is effectively prevented.

Figure 3:
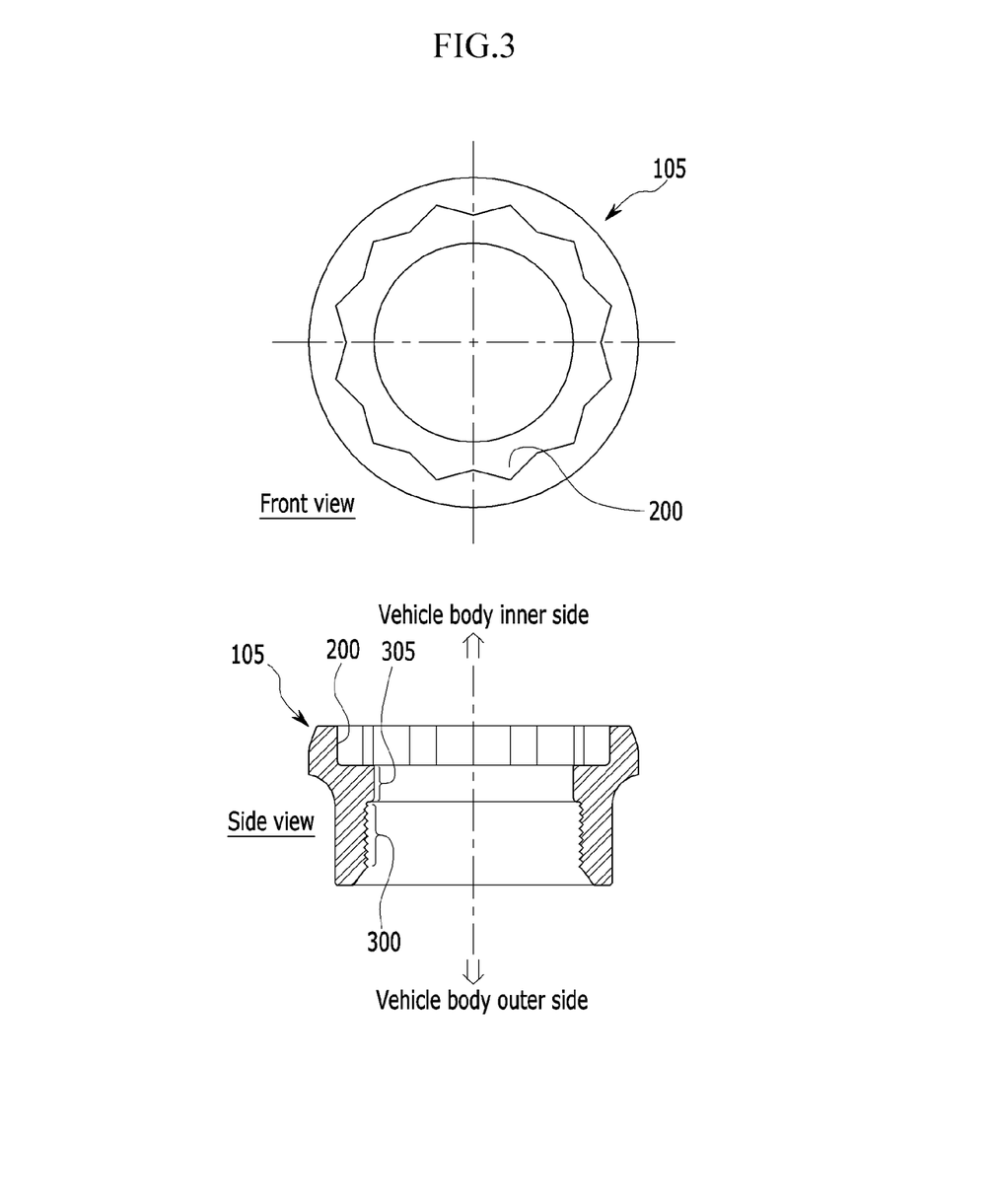
FIG. 3 shows a front view and a cross-sectional view of an inner race that is disposed on a wheel bearing assembly according to an exemplary embodiment of the present invention.

FIG. 3 shows a front view and a cross-sectional view of an inner race that is disposed on a wheel bearing assembly according to an exemplary embodiment of the present invention.

Referring to FIG. 3, the inner race socket portion 200 is formed at a vehicle body inner side on an interior circumference of the inner race 105, and the inner race socket portion 200 has a groove structure corresponding to an engagement tool. The inner race socket portion 200 has a dodecagon shape in the present exemplary embodiment, but this can be configured by all types of polygons such as a tetragon, a hexagon, an octagon, and so on.

The inner race socket portion 200, the inner race forcible insertion portion 305, and the inner race screw portion 300 are sequentially formed from a vehicle body inner side to a vehicle body outer side.

FIG. 4 is a perspective view of an inner race according to another exemplary embodiment of the present invention.

The description of parts that are equivalent to the inner race 105 of FIG. 3 will be omitted, and different parts will be described in FIG. 4.

An inner race 105 has a tapered surface 201 as shown in the present exemplary embodiment. The tapered surface 201 shown is planar, but can be a curved surface. As described, because the interior diameter of the inner race 105 is gradually reduced from the vehicle body inner side to a vehicle body outer side direction, there is an effect that an engagement tool is easily inserted into the inner race from an inner side to an outer side of the vehicle body.

Figure 5:
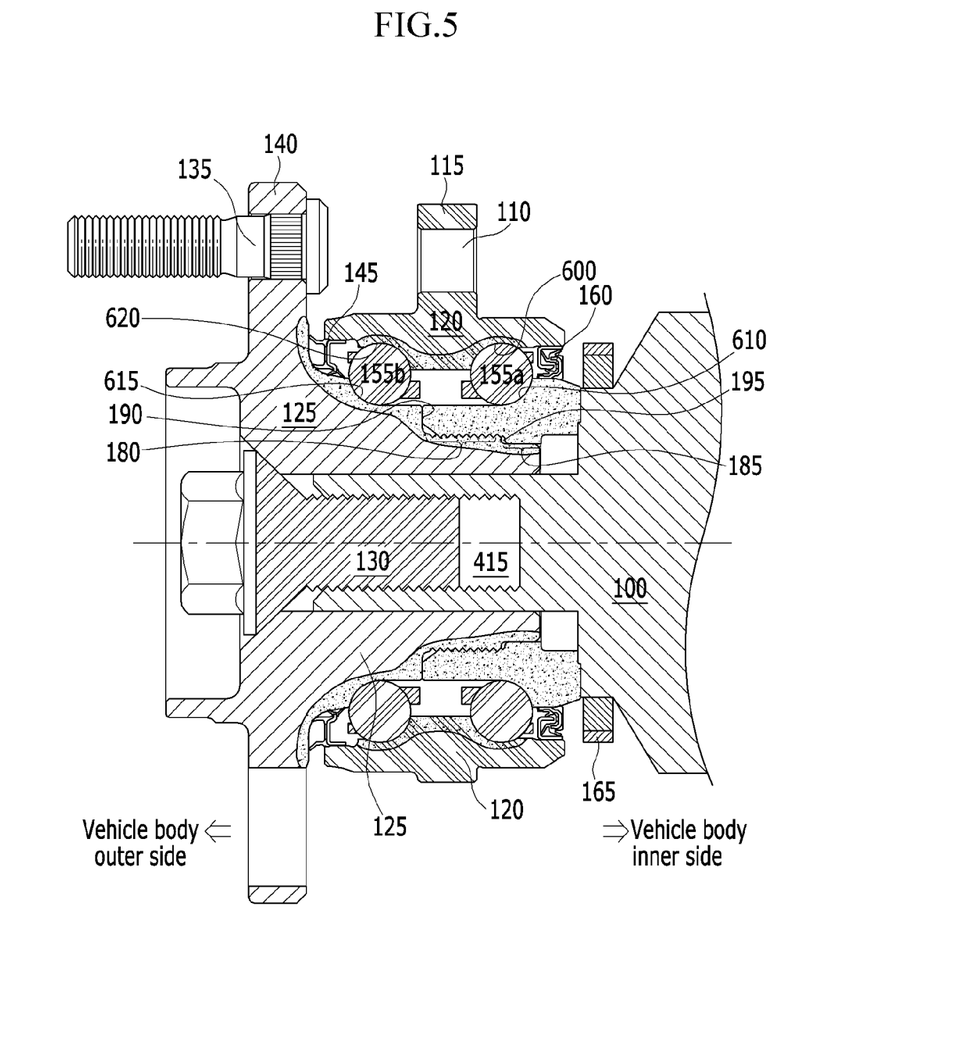
FIG. 5 is an entire cross-sectional view showing a part that is treated with heat in wheel bearing assembly according to an exemplary embodiment of the present invention.

FIG. 5 is an entire cross-sectional view showing a part that is treated with heat in a wheel bearing assembly according to an exemplary embodiment of the present invention.

Referring to FIG. 5, the first roller 155*a* contacts a first outer race track portion 600 of the outer race and contacts an inner race track portion 610 of the inner race 105. Similarly, the second roller 155*b* contacts a second outer race track portion 620 of the outer race 120 and contacts a hub track portion 615 of the hub 125. The outer race track portions 600 and 620 and rollers 155*a* and 155*b* are formed in at least two rows.

The first and second outer race track portions 600 and 620 that contact the rollers 155*a* and 155*b* are basically treated with heat to be hardened so as to improve the durability of the outer race 120 that contacts the rollers 155*a* and 155*b*.

Further, the first outer race track portion 600, the second outer race track portion 620, and a portion between them are all integrally treated with heat.

If only the first outer race track portion 600 and the second outer race track portion 620 are treated with heat, a torque is generated in the outer race 120 by the stress that is respectively formed by the first roller 155*a* and the second roller 155*b* such that the outer race 120 is twisted.

However, because the first outer race track portion 600, the second outer race track portion 620, and a portion between them are all integrally treated with heat to be hardened in an exemplary embodiment of the present invention, the outer race 120 is prevented from being twisted by the stress that is formed by the first and second roller 155*a* and 155*b*.

In an exemplary embodiment of the present invention, the inner race 105 is engaged with the hub 125 in a condition that the entire inner race 105 is treated with heat to be hardened (generally this is called "all hardening") including the inner race track portion 610 contacting the first roller 155*a*.

The hub track portion 615 contacting the second roller 155*b* on the hub 125 is treated with heat, and a part corresponding to the sealing member 145 is integrally treated with heat together with the hub track portion 615.

Also, a close contact surface where the hub 125 and the inner race 105 contact is treated with heat, and the close contact surface is integrally treated with heat together with the hub track portion 615.

In addition, it is desirable that a part where the hub 125 and the inner race 105 contact on the screw portion 180 and the forcible insertion portion 185 is integrally treated with heat together with the hub track portion 615 to be hardened so as to improve durability.

Also, as shown in the drawings, it is desirable that a heat treatment portion is sufficiently widely and lengthily spread to a part where the sealing member 145 contacts the hub flange 140 from a base portion of an inner side surface of the hub flange 140 to an outer side in a radius direction.

Figure 6:
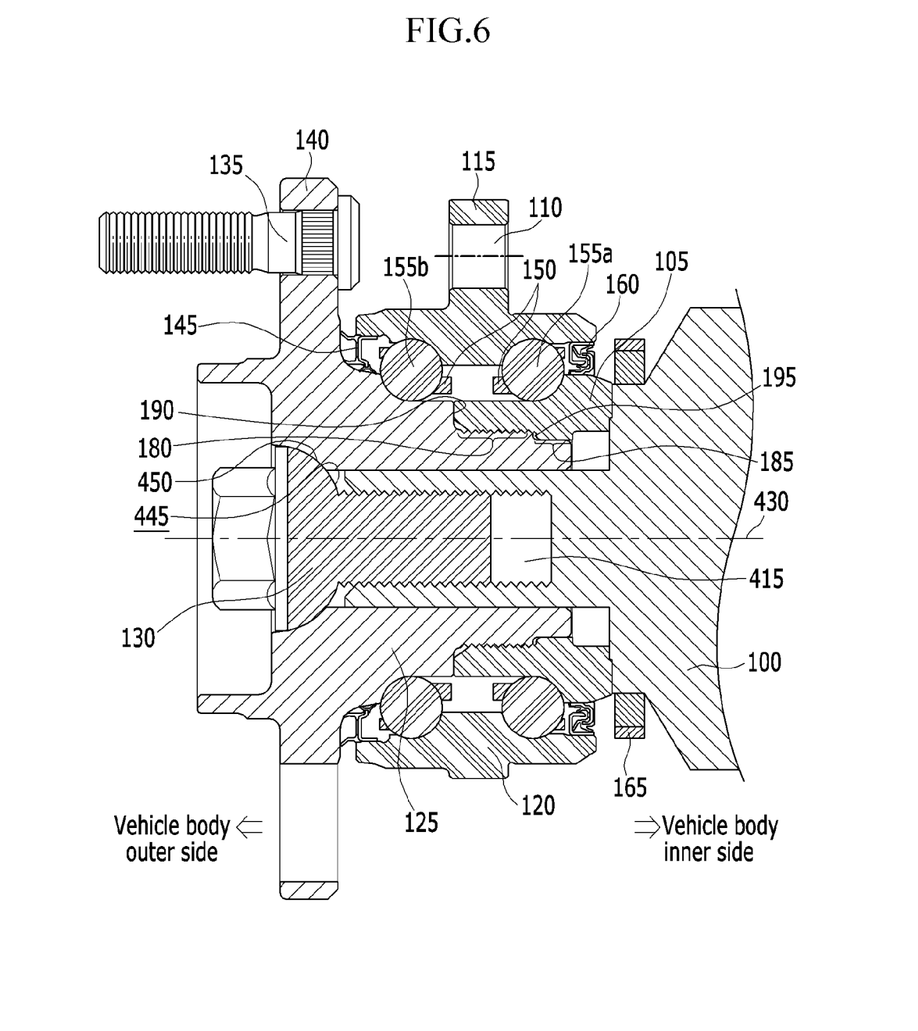
FIG. 6 is a partial cross-sectional view showing a center bolt 130 according to another exemplary embodiment of the present invention.

FIG. 6 is a partial cross-sectional view showing a center bolt 130 according to another exemplary embodiment of the present invention.

The center bolt slant surface 445 and the hub slant surface 450 can have a curved surface or a composite curve surface including a plane surface and a curved surface. An example in which each slant surface 445 and 450 is formed as a spherical surface is shown in FIG. 6.

In this way, a plane surface and/or a curved surface corresponding to each other are respectively formed on the center bolt 130 and the hub 120 such that the center bolt 130 is disposed at a center of the hub 120. Also, because the contact area of the center bolt 130 and the hub 120 is increased, the inflow of the foreign materials is prevented and a loosening phenomenon of the center bolt can be prevented.

Further, the rollers 155*a* and 155*b* are introduced as a ball type in the above exemplary embodiment, but the rollers can be cylindrical rollers or tapered rollers depending on the cases.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A wheel bearing assembly, comprising:
   an outer race in which a plurality of rows of track portions are formed at an inner side thereof;
   a hub that is coaxially disposed with the outer race to be rotatably disposed in the outer race;
   an inner race that is engaged with a portion of an outside surface of the hub to rotate together with the hub;
   a first roller that is interposed between the hub and the outer race to be rolled; and
   a second roller that is interposed between the inner race and the outer race to be rolled,
   wherein a hub screw portion and a hub forcible insertion portion that is formed near the hub screw portion are formed on one side external circumferential surface of the hub in a circumferential direction, and
   an inner race screw portion that is engaged with the hub screw portion and an inner race forcible insertion portion that is forcibly inserted into the hub forcible insertion portion are formed on an interior circumference of the inner race in a circumferential direction.

2. The wheel bearing assembly of claim 1, wherein the hub screw portion is disposed at a vehicle body outer side and the hub forcible insertion portion is disposed at a vehicle body inner side.

3. The wheel bearing assembly of claim 1, wherein a length Li of the inner race screw portion is formed to be longer than a length Lh of the hub screw portion.

4. The wheel bearing assembly of claim 1, wherein a diameter Dt of the hub screw portion is formed to be larger than a diameter Df of the hub forcible insertion portion.

5. The wheel bearing assembly of claim 1, wherein a length Li of the inner race screw portion is formed to be longer than a length Lf of the hub forcible insertion portion.

6. The wheel bearing assembly of claim 1, wherein an inner race socket portion is formed at an inner side end portion of an interior circumference of the inner race.

7. The wheel bearing assembly of claim 6, wherein the inner race socket portion has a polygon shape that is symmetrically formed based on a rotation center axis.

8. The wheel bearing assembly of claim 6, wherein the inner race is pushed toward the hub such that the inner race is engaged with the hub.

9. The wheel bearing assembly of claim 6, comprising:
a drive shaft that is inserted into an center axis of the hub from a vehicle body inner side to rotate the hub; and
a center bolt that is inserted along the center axis of the hub from a vehicle body outer side to a vehicle body inner side to be engaged by a screw structure with a center bolt mounting hole that is formed in the drive shaft such that the drive shaft is tightly engaged with the inner race.

10. The wheel bearing assembly of claim 6, wherein a center bolt slant surface of which the diameter thereof is reduced from a vehicle body outer side to an vehicle body inner side is continuously formed on an external circumferential surface of the center bolt in a circumferential direction thereof,
a hub slant surface corresponding to the center bolt slant surface is continuously formed on an interior circumference of the hub in a circumferential direction thereof, and
the center bolt slant surface and the hub slant surface continuously contact in a circumferential direction.

11. The wheel bearing assembly of claim 6, wherein a taper surface of which a section thereof is reduced from a vehicle body inner side to a vehicle body outer side is formed at an edge portion of a vehicle body inner side of the inner race socket portion.

12. The wheel bearing assembly of claim 11, wherein the taper surface is a plane surface, a curved surface, or a composited surface including the plane surface and the curved surface.

13. The wheel bearing assembly of claim 1, wherein a first outer race track portion that contacts a first roller that is disposed at a vehicle body inner side and a second outer race track portion that contacts a second roller that is disposed at a vehicle body outer side are formed in the outer race, and
the first outer race track portion, the second outer race track portion, and an area between the first outer race track and the second outer race track portion of the outer race are integrally treated with heat.

14. The wheel bearing assembly of claim 13, wherein an inner race track portion that contacts the first roller is formed on the inner race,
a hub track portion that contacts the second roller is formed on the hub, and
the hub track portion, the inner race track portion, and an area between the hub track portion and the inner race track portion are integrally treated with heat.

15. The wheel bearing assembly of claim 14, wherein an outside portion of the hub corresponding to a sealing member that is interposed between the outer race and the hub and the hub track portion are integrally treated with heat.

16. The wheel bearing assembly of claim 14, wherein after all of the inner race is treated with heat, the inner race is engaged with the hub.

17. The wheel bearing assembly of claim 14, wherein parts where the hub and the inner race are engaged through a screw, engaged through compression, or engaged through close contact are all treated with heat.

18. The wheel bearing assembly of claim 14, wherein at least one of the center bolt slant surface and the hub slant surface is a plane surface, a curved surface, or a composite curve surface including the plane surface and the curved surface.

* * * * *